United States Patent
Ota et al.

(10) Patent No.: US 6,552,136 B1
(45) Date of Patent: Apr. 22, 2003

(54) ORGANOSILICON COMPOUND, CATALYST FOR OLEFIN POLYMER PRODUCTION, AND METHOD FOR PRODUCING OLEFIN POLYMER

(75) Inventors: Tsuyoshi Ota, Ichihara (JP); Takanori Sadashima, Ichihara (JP); Yasunori Kadoi, Ichihara (JP); Toshio Isozaki, Ichihara (JP); Kiyokazu Katayama, Ichihara (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 68 days.

(21) Appl. No.: 09/774,174

(22) PCT Filed: Jun. 1, 2000

(86) PCT No.: PCT/JP00/03549

§ 371 (c)(1),
(2), (4) Date: Feb. 1, 2001

(30) Foreign Application Priority Data

Jun. 1, 1999 (JP) .......................................... 11-153546

(51) Int. Cl.$^7$ ................................................. C08F 4/42
(52) U.S. Cl. ..................... 526/128; 526/124.3; 526/351; 526/158; 526/123.1; 502/103; 502/118; 502/158; 556/9

(58) Field of Search ............................... 526/124.3, 351, 526/158, 123.1, 128; 502/103, 118, 158; 556/9

(56) References Cited

U.S. PATENT DOCUMENTS

| 4,958,041 A | * | 9/1990 | Graefe et al. ................ 556/480 |
| 5,192,732 A | * | 3/1993 | Duranel et al. .............. 502/126 |
| 5,556,820 A | | 9/1996 | Funabashi et al. |

FOREIGN PATENT DOCUMENTS

| JP | 3-033104 | | 2/1991 |
| JP | 03-033104 | * | 2/1991 |
| JP | 6-298835 | | 10/1994 |
| JP | 06-298835 | * | 10/1994 |
| JP | 11-246569 | | 9/1999 |

* cited by examiner

*Primary Examiner*—David W. Wu
*Assistant Examiner*—Ling-Siu Choi
(74) *Attorney, Agent, or Firm*—Oblon, Spivak, McClelland, Maier & Neustadt, P.C.

(57) ABSTRACT

Provided are a catalyst for olefin polymer production, which contains an organosilicon compound having a specific structure and with which olefin polymers produced have increased stereospecificity and increased melt fluidity; and a method for producing such olefin polymers.

14 Claims, No Drawings

US 6,552,136 B1

ORGANOSILICON COMPOUND, CATALYST FOR OLEFIN POLYMER PRODUCTION, AND METHOD FOR PRODUCING OLEFIN POLYMER

TECHNICAL FIELD

The present invention relates to an organosilicon compound, to a catalyst for olefin polymer production, and to a method for producing olefin polymers. More precisely, the invention relates to an organosilicon compound having a specific structure, to a catalyst comprising the compound for producing olefin polymers having increased stereospecificity and increased melt fluidity, and to a method for producing such olefin polymers.

BACKGROUND ART

As having a high degree of crystallinity, olefin polymers, especially polypropylenes are tough and have good tensile strength, heat resistance, chemical resistance and optical characteristics, and are well workable. In addition, they are more lightweight than polystyrenes, and are much used in the field of injection moldings, containers, wrapping and packaging materials, etc.

However, in order to further broaden the application field of polypropylenes, their toughness and heat resistance that are inferior to those of polystyrenes and ABS resins must be further improved. It is known that olefin polymers having a higher degree of stereospecificity have higher toughness and better heat resistance. Therefore, it is desired to further increase the stereospecificity of olefin polymers.

In general, olefin polymers are produced by the use of Ziegler-Natta catalysts comprising a titanium compound and an organoaluminium compound, for which, therefore, tried are (1) increasing catalyst activity, (2) increasing the stereospecificity of olefin polymers produced, and (3) improving the powdery morphology of olefin polymers for their stable production.

In producing polypropylenes, generally used is a catalyst system that comprises a solid catalyst component composed of titanium, magnesium, chlorine and an electron donor compound, and an organoaluminium compound. It is known that adding an organosilicon compound with Si—O—C bonds to the catalyst system increases the stereospecificity of the polymers produced. For example, Japanese Patent Laid-Open No. 84404/1990 discloses a catalyst system that comprises a cyclopentylalkyldimethoxysilane, dicyclopentyldimethoxysilane or the like. However, the silicon compound-containing catalyst system disclosed is problematic in that the melt fluidity dependency of the polymers produced on the amount of hydrogen used in their production is low, and therefore a larger amount of hydrogen must be used for producing polymers having increased melt fluidity, which, however, detracts from the productivity of the polymers since the monomer partial pressure shall be low.

On the other hand, Japanese Patent Laid-Open No. 223008/1988 discloses a catalyst system containing di-n-propyldimethoxysilane or the like, in which the silicon compound used increases the melt fluidity dependency of the polymers produced on the amount of hydrogen used in their production. However, the stereospecificity of the polymers produced by the use of the catalyst system is still unsatisfactory, and the polymers are still problematic in that their moldings could not still have a desired degree of toughness. Therefore, for obtaining tough moldings of the polymers, their wall thickness must be increased, for which the amount of the polymers to be used shall increase.

The object of the present invention is to provide a catalyst for olefin polymer production, which is effective for producing olefin polymers having increased stereospecificity and increased melt fluidity, and also to provide a method for producing such olefin polymers.

DISCLOSURE OF THE INVENTION

We, the present inventors have assiduously studied in order to attain the object as above, and, as a result, have found that the problems noted above can be solved by the use of a catalyst for olefin polymer production that comprises a solid catalyst component composed of titanium, magnesium and an electron donor compound, an organoaluminium compound, and a novel organosilicon compound of a general formula (I) mentioned below. On the basis of this finding, we have completed the present invention.

Specifically, the invention provides an organosilicon compound, a catalyst for olefin polymer production, and a method for producing olefin polymers, which are mentioned below.

(1) An organosilicon compound of a general formula (I):

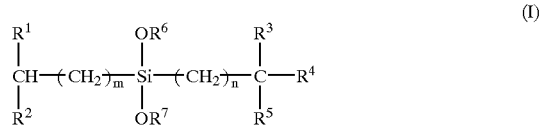

wherein $R^1$ to $R^3$ each represent a hydrogen atom or a hydrocarbon group, and they may be the same or different, and may be bonded to the adjacent group to form a ring; $R^4$ and $R^5$ each represent a hydrocarbon group, and they may be the same or different, and may be bonded to the adjacent group to form a ring; $R^6$ and $R^7$ each represent a linear hydrocarbon group having from 1 to 10 carbon atoms, and they may be the same or different; m is an integer of at least 2; and n is an integer of at least 1.

(2) A catalyst for olefin polymer production, which comprises (A) a solid catalyst component comprising titanium, magnesium and an electron donor compound, (B) an organoaluminium compound, and (C) the organosilicon compound of (1).

(3) A method for producing olefin polymers, which comprises polymerizing an olefin by the use of the olefin polymer production catalyst of (2).

(4) The method for producing olefin polymers of (3), wherein the olefin is propylene.

BEST-MODES OF CARRYING OUT THE INVENTION

The organosilicon compound of the invention is a novel compound having the structure of above-mentioned general formula (I). That is, the compound is represented by:

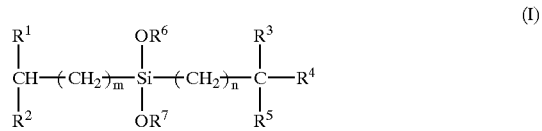

wherein $R^1$ to $R^3$ each represent a hydrogen atom or a hydrocarbon group, and they may be the same or different, and may be bonded to the adjacent group to form a ring; $R^4$ and $R^5$ each represent a hydrocarbon group, and they may be the same or different, and may be bonded to the adjacent group to form a ring; $R^6$ and $R^7$ each represent a linear hydrocarbon group having from 1 to 10 carbon atoms, and they may be the same or different; m is an integer of at least 2; and n is an integer of at least 1.

Concretely, $R^1$ to $R^3$ include a hydrogen atom; linear hydrocarbon groups such as methyl, ethyl and n-propyl groups; branched hydrocarbon groups such as isopropyl, isobutyl, t-butyl and thexyl groups; saturated cyclic hydrocarbon groups such as cyclobutyl, cyclopentyl and cyclohexyl groups; and unsaturated cyclic hydrocarbon groups such as phenyl and pentamethylphenyl groups. Of those preferred are a hydrogen atom and linear hydrocarbon groups having from 1 to 6 carbon atoms; and especially preferred are a hydrogen atom, and methyl and ethyl groups.

$R^4$ and $R^5$ include linear hydrocarbon groups such as methyl, ethyl and n-propyl groups; branched hydrocarbon groups such as isopropyl, isobutyl, t-butyl and thexyl groups; saturated cyclic hydrocarbon groups such as cyclobutyl, cyclopentyl and cyclohexyl groups; and unsaturated cyclic hydrocarbon groups such as phenyl and pentamethylphenyl groups. These may be the same or different. Of those, preferred are linear hydrocarbon groups having from 1 to 6 carbon atoms; and especially preferred are methyl and ethyl groups.

$R^6$ and $R^7$ include linear alkyl groups such as methyl, ethyl, n-propyl, n-butyl, n-pentyl, n-hexyl and n-octyl groups. These may be the same or different. Of those, preferred are linear alkyl groups having 1 or 2 carbon atoms; and especially preferred is a methyl group.

Typical examples of the organosilicon compound of formula (I) are those where $R^1$ to $R^3$ each are a hydrogen atom, or a linear hydrocarbon group having from 1 to 6 carbon atoms, and they may the same or different, and may be bonded to the adjacent group to form a ring; $R^4$ and $R^5$ each are a linear hydrocarbon group having from 1 to 6 carbon atom, and they may be the same or different, and may be bonded to the adjacent group to form a ring; and $R^6$ and $R^7$ each are a linear alkyl group having 1 or 2 carbon atoms, and they may be the same or different, and may be bonded to the adjacent group to form a ring.

Concretely, preferred examples of the organosilicon compound of formula (I) are neopentyl-n-propyldimethoxysilane, neopentyl-n-butyldimethoxysilane, neopentyl-n-pentyldimethoxysilane, neopentyl-n-hexyldimethoxysilane, neopentyl-n-heptyldimethoxysilane, isobutyl-n-propyldimethoxysilane, isobutyl-n-butyldimethoxysilane, isobutyl-n-pentyldimethoxysilane, isobutyl-n-hexyldimethoxysilane, isobutyl-n-heptyldimethoxysilane, 2-cyclohexylpropyl-n-propyldimethoxysilane, 2-cyclohexylbutyl-n-propyldimethoxysilane, 2-cyclohexylpentyl-n-propyldimethoxysilane, 2-cyclohexylhexyl-n-propyldimethoxysilane, 2-cyclohexylheptyl-n-propyldimethoxysilane, 2-cyclopentylpropyl-n-propyldimethoxysilane, 2-cyclopentylbutyl-n-propyldimethoxysilane, 2-cyclopentylpentyl-n-propyldimethoxysilane, 2-cyclopentylhexyl-n-propyldimethoxysilane, 2-cyclopentylheptyl-n-propyldimethoxysilane, isopentyl-n-propyldimethoxysilane, isopentyl-n-butyldimethoxysilane, isopentyl-n-pentyldimethoxysilane, isopentyl-n-hexyldimethoxysilane, isopentyl-n-heptyldimethoxysilane, isopentylisobutyldimethoxysilane, isopentylneopentyldimethoxysilane, diisopentyldimethoxysilane, diisoheptyldimethoxysilane, diisohexyldimethoxysilane, etc. Especially preferred are neopentyl-n-propyldimethoxysilane, neopentyl-n-pentyldimethoxysilane, isopentylneopentyldimethoxysilane, diisopentyldimethoxysilane, diisoheptyldimethoxysilane, and diisohexyldimethoxysilane; and more preferred are neopentyl-n-pentyldimethoxysilane and diisopentyldimethoxysilane.

The organosilicon compounds of the invention can be produced in any desired manner. Some typical routes for producing them are mentioned below.

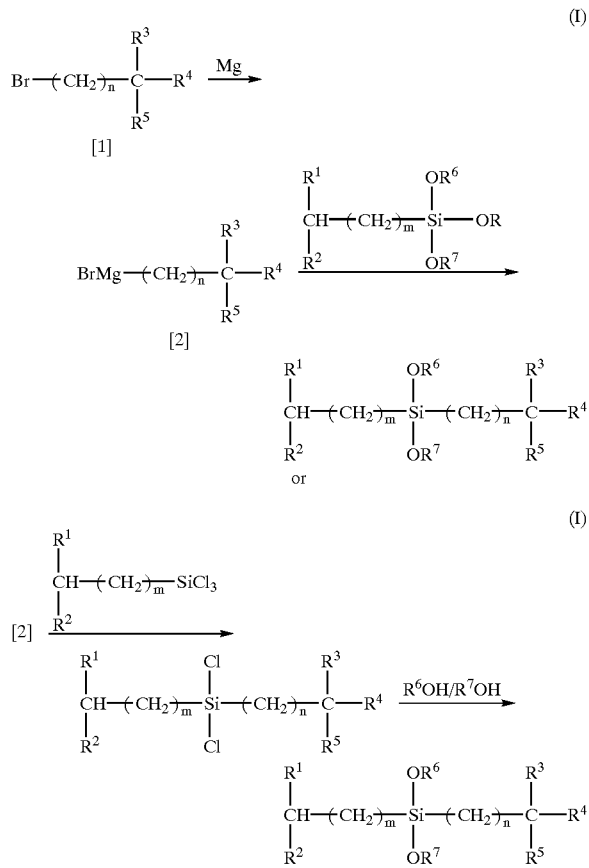

In the production routes, the starting compounds [1] are available on the market, or can be obtained, for example, through known alkylation or halogenation. The compounds [1] may be processed for known Grignard reaction to form the organosilicon compounds of formula (I).

The olefin polymerization catalyst of the invention comprises (A) a solid catalyst component comprising titanium, magnesium and an electron donor compound, (B) an organoaluminium compound, and (C) the organosilicon compound of formula (I). The method of the invention for producing olefin polymers comprises polymerizing an olefin by the use of the olefin polymerization catalyst. If desired, the olefin polymerization catalyst of the invention may be held on a carrier, or may be prepared through prepolymerization.

The catalyst components, the method for preparing the catalyst, and the polymerization method are described below.

[I] Catalyst Components (A) Solid Catalyst Component for Olefin Polymer Production The solid catalyst component for olefin polymer production comprises titanium, magnesium and an electron donor compound, and is formed from (a) a titanium compound, (b) a magnesium compound, and (c) an electron donor compound, which are mentioned below.

(a) Titanium Compound:

The titanium compound for use herein is not specifically defined, but preferred are those of a general formula (II):

$$TiX^1_p(OR^8)_{4-p} \qquad (II).$$

In formula (II), $X^1$ represents a halogen atom, preferably a chlorine or bromine atom, more preferably a chlorine atom. $R^8$ represents a hydrocarbon group, which may be saturated or unsaturated, and may be linear, branched or cyclic. It may contain a hetero atom such as sulfur, nitrogen, oxygen, silicon or phosphorus atom. Preferably, $R^8$ is a hydrocarbon group having from 1 to 10 carbon atoms, more preferably an alkyl, alkenyl, cycloalkenyl, aryl or aralkyl group, and even more preferably a linear or branched alkyl group. A plurality of —$OR^8$'s, if any in formula (II), may be the same or different. Specific examples of $R^8$ are methyl, ethyl, n-propyl, isopropyl, n-butyl, sec-butyl, isobutyl, n-pentyl, n-hexyl, n-heptyl, n-octyl, n-decyl, allyl, butenyl, cyclopentyl, cyclohexyl, cyclohexenyl, phenyl, tolyl, benzyl and phenethyl groups. 'p' is an integer falling between 0 and 4.

Specific examples of the titanium compound of formula (II) are tetraalkoxytitaniums such as tetramethoxytitanium, tetraethoxytitanium, tetra-n-propoxytitanium, tetraisopropoxytitanium, tetra-n-butoxytitanium, tetraisobutoxytitanium, tetracyclohexyloxytitanium, tetraphenoxytitanium; titanium tetrahalides such as titanium tetrachloride, titanium tetrabromide, titanium tetraiodide; alkoxytitanium trihalides such as methoxytitanium trichloride, ethoxytitanium trichloride, n-propoxytitanium trichloride, n-butoxytitanium trichloride, ethoxytitanium tribromide; dialkoxytitanium dihalides such as dimethoxytitanium dichloride, diethoxytitanium dichloride, diisopropoxytitanium dichloride, di-n-propoxytitanium dichloride, diethoxytitanium dibromide; trialkoxytitanium monohalides such as trimethoxytitanium chloride, triethoxytitanium chloride, triisopropoxytitanium chloride, tri-n-propoxytitanium chloride, tri-n-butoxytitanium chloride, etc. Of those, preferred are high-halogen titanium compounds, and especially preferred is titanium tetrachloride. One or more of these titanium compounds may be used herein either singly or as combined.

(b) Magnesium Compound:

The magnesium compound for use herein is not specifically defined, but preferred are those of a general formula (III):

$$MgR^9R^{10} \qquad (III).$$

In formula (III), $R^9$ and $R^{10}$ each represent a hydrocarbon group, $OR^{11}$ (where $R^{11}$ is a hydrocarbon group), or a halogen atom. The hydrocarbon group for $R^9$ and $R^{10}$ includes, for example, an alkyl group having from 1 to 12 carbon atoms, a cycloalkyl group, an aryl group or an aralkyl group; $R^{11}$ in $OR^{11}$ for these includes, for example, an alkyl group having from 1 to 12 carbon atoms, a cycloalkyl group, an aryl group or an aralkyl group; and the halogen atom for these includes chlorine, bromine, iodine and fluorine atoms. $R^9$ and $R^{10}$ may be the same or different.

Specific examples of the magnesium compound of formula (III) are alkylmagnesiums and arylmagnesiums such as dimethylmagnesium, diethylmagnesium, diisopropylmagnesium, dibutylmagnesium, dihexylmagnesium, dioctylmagnesium, ethylbutylmagnesium, diphenylmagnesium, dicyclohexylmagnesium, butyloctylmagnesium; alkoxymagnesiums and aryloxymagnesiums such as dimethoxymagnesium, diethoxymagnesium, dipropoxymagnesium, dibutoxymagnesium, dihexyloxymagnesium, dioctoxymagnesium, diphenoxymagnesium, dicyclohexyloxymagnesium; alkylmagnesium halides and arylmagnesium halides such as ethylmagnesium chloride, butylmagnesium chloride, hexylmagnesium chloride, isopropylmagnesium chloride, isobutylmagnesium chloride t-butylmagnesium chloride, phenylmagnesium bromide, benzylmagnesium chloride, ethylmagnesium bromide, butylmagnesium bromide, phenylmagnesium chloride, butylmagnesium iodide; alkoxymagnesium halides and aryloxymagnesium halides such as butoxymagnesium chloride, cyclohexyloxymagnesium chloride, phenoxymagnesium chloride, ethoxymagnesium bromide, butoxymagnesium bromide, ethoxymagnesium iodide; magnesium halides such as magnesium chloride, magnesium bromide, magnesium iodide, etc.

Of those magnesium compounds, preferred are magnesium halides, alkoxymagnesiums, alkylmagnesiums, and alkylmagnesium halides.

The magnesium compounds may be prepared from metal magnesium, or magnesium-containing compounds.

One example of the method for preparing them comprises contacting metal magnesium with a halogen and an alcohol. The halogen includes iodine, chlorine, bromine and fluorine. Of those, preferred is iodine. The alcohol includes methanol, ethanol, propanol, butanol, octanol, etc.

Another example comprises contacting a magnesium alkoxide of $Mg(OR^{12})_2$ (where $R^{12}$ represents a hydrocarbon group having from 1 to 20 carbon atoms) with a halide. The halide includes silicon tetrachloride, silicon tetrabromide, tin tetrachloride, tin tetrabromide, hydrogen chloride, etc. Of those, preferred is silicon tetrachloride.

For $R^{12}$, mentioned are an alkyl group such as methyl, ethyl, propyl, isopropyl, butyl, isobutyl, hexyl or octyl group; a cyclohexyl group; an alkenyl group such as allyl, propenyl or butenyl group; an aryl group such as phenyl, tolyl or xylyl group; and an aralkyl group such as phenethyl or 3-phenylpropyl group. Of those, especially preferred are alkyl groups having from 1 to 10 carbon atoms.

The magnesium compound may be held on a carrier of silica, alumina, polystyrene or the like. The magnesium compounds mentioned above may be used herein either singly or as combined. They may contain, if desired, any other element of halogens such as iodine, or silicon, aluminium, etc., and may contain an electron donor of alcohols, ethers, esters, etc.

(c) Electron Donor Compound:

The electron donor compound includes oxygen-containing electron donors, for example, alcohols, phenols, ketones, aldehydes, esters of organic acids or inorganic acids, ethers such as monoethers, diethers or polyethers; and nitrogen-containing electron donors such as ammonia, amines, nitriles, isocyanates. The organic acids include carboxylic acids, and concretely mentioned is malonic acid. Of those electron donor compounds, preferred are polycarboxylates, and more preferred are aromatic polycarboxylates. Even more preferred are aromatic dicarboxylates. Preferably, the organic group in the ester moiety of these esters is a linear, branched or cyclic aliphatic hydrocarbon residue.

For these, concretely mentioned are dialkyl esters of dicarboxylic acids such as phthalic acid, naphthalene-1,2-dicarboxylic acid, naphthalene-2,3-dicarboxylic acid, 5,6,7, 8-tetrahydronaphthalene-1,2-dicarboxylic acid, 5,6,7,8-tetrahydronaphthalene-2,3-dicarboxylic acid, indane-4,5-dicarboxylic acid, indane-5,6-dicarboxylic acid, in which the alkyl groups may be any of methyl, ethyl, n-propyl, isopropyl, n-butyl, isobutyl, t-butyl, n-pentyl, 1-methylbutyl, 2-methylbutyl, 3-methylbutyl, 1,1-dimethylpropyl, 1-methylpentyl, 2-methylpentyl, 3-methylpentyl, 4-methylpentyl, 1-ethylbutyl, 2-ethylbutyl, n-hexyl, cyclohexyl, n-heptyl, n-octyl, n-nonyl, 2-methylhexyl, 3-methylhexyl, 4-methylhexyl, 2-ethylhexyl, 3-ethylhexyl, 4-ethylhexyl, 2-methylpentyl, 3-methylpentyl, 2-ethylpentyl and 3-ethylpentyl groups. Of these, preferred are diphthalates. Preferably, the organic group in the ester moiety of these esters is a linear or branched aliphatic hydrocarbon residue having at least 4 carbon atoms.

Preferred examples of the esters are di-n-butyl phthalate, diisobutyl phthalate, di-n-heptyl phthalate and diethyl phthalate.

These compounds may be used herein either singly or as combined.

(B) Organoaluminium Compound

The organoaluminium compound (B) for use in the invention is not specifically defined, but preferred are those having any of alkyl groups, halogen atoms, hydrogen atoms and alkoxy groups, aluminoxanes, and their mixtures. Concretely, they include trialkylaluminiums such as trimethylaluminium, triethylaluminium, triisopropylaluminium, triisobutylaluminium, trioctylaluminium; dialkylaluminium monochlorides such as diethylaluminium monochloride, diisopropylaluminium monochloride, diisobutylaluminium monochloride, dioctylaluminium monochloride; alkylaluminium sesquihalides such as ethylaluminium sesquichloride; linear aluminoxanes such as methylaluminoxane, etc. Of those organoaluminium compounds, preferred are trialkylaluminiums with lower alkyl groups each having from 1 to 5 carbon atoms; and more preferred are trimethylaluminium, triethylaluminium, tripropylaluminium, and triisobutylaluminium. One or more of these organoaluminium compounds are usable herein either singly or as combined.

(C) Organosilicon Compound

The catalyst of the invention for olefin polymer production contains the organosilicon compound of formula (I) for the component (C).

One or more such organosilicon compounds may be used herein either singly or as combined.

[II] Preparation of Solid Catalyst Component

There is no specific limitation on the method of preparing the solid catalyst component (A). To prepare it, for example, the titanium compound (a), themagnesiumcompound (b), the electron donor compound (c) and optionallyahalide (d) such as silicon tetrachloride may be contacted in any desired manner.

Some methods for preparing it are known, including those described in Japanese Patent Laid-Open Nos. 43094/1978, 135102/1980, 135103/1980 and 18606/1981. For example, herein employable are (1) a method comprising grinding a magnesium compound or a complex of a magnesium compound and an electron donor compound, in the presence of an electron donor compound and optionally a grinding aid, followed by reacting it with a titanium compound; (2) a method comprising reacting a liquid magnesium compound of no reducibility with a liquid titanium compound in the presence of an electron donor compound to give a solid titanium complex; (3) a method comprising reacting the product obtained in (1) or (2) with a titanium compound; (4) a method comprising reacting the product obtained in (1) or (2) with an electron donor compound and a titanium compound; (5) a method comprising grinding a magnesium compound or a complex of a magnesium compound and an electron donor compound, in the presence of an electron donor compound, a titanium compound and optionally a grinding aid, followed by processing it with a halogen or halide.

Apart from these methods, the solid catalyst component (A) may also be prepared according to the methods described in Japanese Patent Laid-Open Nos. 166205/1981, 63309/1982, 190004/1982, 300407/1982 and 47003/1983. For example, one method described comprises contacting an alkoxymagnesium with an electron donor compound and a titanium compound.

Still another method employable herein for preparing the solid catalyst component comprises holding a magnesium compound such as that mentioned above on a carrier of, for example, an oxide of an element of Groups II to IV of the Periodic Table (e.g., silicon oxide, silicon magnesium) or a composite oxide containing at least one oxide of an element of Groups II to IV of the Periodic Table (e.g., silica-alumina), followed by contacting the resulting solid with an electron donor and a titanium compound in a solvent at a temperature falling between 0 and 200° C., preferably between 10 and 150° C., for 2 minutes to 24 hours. For its type, the carrier is not specifically defined, and may be any of inorganic oxide carriers or other inorganic or organic carriers. For morphology control, however, preferred are inorganic oxide carriers and other inorganic carriers.

Concretely, the inorganic oxide carriers include $SiO_2$, $Al_2O_3$, MgO, $ZrO_2$, $TiO_2$, $Fe_2O_3$, $B_2O_3$, CaO, ZnO, BaO, $ThO_2$ and their mixtures, such as silica-alumina, zeolite, ferrite, and grass fibers. Of those, especially preferred are $SiO_2$ and $Al_2O_3$. The inorganic oxide carriers may contain minor carbonates, nitrates, sulfates, etc.

Except those mentioned above, the carriers may further include magnesium compounds of a general formula, $MgR^{13}_x X^2_y$, such as typically $MgCl_2$ and $Mg(OC_2H_5)_2$, and their complexes. In the formula, $R^{13}$ represents an alkyl group having from 1 to 20 carbon atoms, an alkoxy group having from 1 to 20 carbon atoms, or an aryl group having from 6 to 20 carbon atoms; $X^2$ represents a halogen atom, or an alkyl group having from 1 to 20 carbon atoms; x falls between 0 and 2, y falls between 0 and 2; and x+y=2. $R^{13}$'s and also $X^2$'s may be the same or different.

The organic carriers include polymers such as polystyrenes, styrene-divinylbenzene copolymers, polyethylenes, polypropylenes, substituted polystyrenes, polyarylates; and starch and carbon.

For the carrier for use in the invention, preferred are $MgCl_2$, $MgCl(OC_2H_5)$, $Mg(OC_2H_5)_2$, $SiO_2$, and $Al_2O_3$. The properties of the carrier will vary, depending on the type thereof and the method for producing it. In general, however, the mean particle size of the carrier falls between 1 and 300 μm, preferably between 10 and 200 μm, more preferably between 20 and 100 μm. Too small carriers are unfavorable as increasing the fine powder in the polymer produced; but too large carriers are also unfavorable as increasing coarse particles in the polymer produced, thereby lowering the bulk density of the polymer and often clogging hoppers.

The specific surface area of the carrier may fall generally between 1 and 1000 $m^2$/g, but preferably between 50 and 500 m²/g; and the pore volume thereof may fall generally between 0.1 and 5 cm³/g, but preferably between 0.3 and 3 cm³/g. When any of the specific surface area or the pore volume oversteps the defined range, the catalyst activity will lower. The specific surface area and the pore volume may be obtained from the volume of the nitrogen gas adsorbed by the carrier, according to the BET method (see J. Am. Chem. Soc., Vol. 60, p. 309, 1983). It is desirable that the carrier is baked generally at 150 to 1000° C., preferably at 200 to 800° C., before used herein. In view of its ability for better morphology control and of its applicability to processes of vapor-phase polymerization, the solid catalyst component is preferably held on the carrier.

The optional component (d), halide includes silicon tetrabromide, tin tetrachloride, tin tetrabromide and hydrogen chloride, in addition to silicon tetrachloride.

The amount of the titanium compound to be used in preparing the solid catalyst component may fall generally between 0.5 and 100 mols, but preferably between 1 and 50 mols, per mol of magnesium of the magnesium compound to be used for the component. The amount of the electron donor to be used may fall generally between 0.01 and 10 mols, but preferably between 0.05 and 0.15 mols, per mol of magnesium of the magnesium compound. A halide, silicon tetrachloride or the like may be added thereto. Adding such a halide can improve the catalyst activity and the stereospecificity of the polymer produced, and can reduce the amount of fine powder in the polymer. The amount of the halide to be added thereto may fall generally between 0.001 mol/mol-Mg and 100 mol/mol-Mg, but preferably between 0.005 mol/mol-Mg and 50 mol/mol-Mg, more preferably between 0.1 mol/mol-Mg and 1 mol/mol-Mg.

The temperature at which the compounds for the solid catalyst component are contacted with each other may fall generally between −20 and 200° C., but preferably between 20 and 150° C.; and the time for the contact may fall generally between 1 minute and 24 hours, but preferably between 10 minutes and 6 hours.

The order for their contact is not specifically defined. For example, the constituent ingredients may be contacted with each other in the presence of an inert solvent such as a hydrocarbon solvent; or they may be previously diluted with an inert solvent such as a hydrocarbon solvent, and then contacted with each other. The inert solvent includes, for example, aliphatic hydrocarbons such as n-pentane, isopentane, n-hexane, n-heptane, n-octane, isooctane; aromatic hydrocarbons such as benzene, toluene, xylene; and their mixtures.

Preferably, the titanium compound is contacted twice or more with the magnesium compound serving as a carrier, so that it can be well held on the magnesium compound.

The solid catalyst component thus prepared through the contact treatment as above may be washed with an inert solvent such as a hydrocarbon solvent. For the inert solvent, usable are those mentioned above. The solid catalyst component may be stored in dry, or may be stored in an inert solvent such as a hydrocarbon solvent.

[III] Polymerization

The amount of the catalyst components to be used in the invention is not specifically defined. In general, however, the amount of the solid catalyst component (A) to be used may fall between 0.0005 and 1 mmol, in terms of the titanium atom therein, per liter of the reaction capacity. For the amount of the organoaluminium compound (B) to be used, the atomic ratio, aluminium/titanium may fall generally between 1 and 1000, but preferably between 10 and 500. If the atomic ratio oversteps the defined range, the catalyst activity will be low. For the amount of the organosilicon compound (C) to be used, the molar ratio, organosilicon compound (C)/organoaluminium compound (B) may fall generally between 0.02 and 2.0, but preferably between 0.05 and 1.0. If the molar ratio oversteps the defined range, the catalyst activity will also be low.

The olefin to be polymerized herein is not specifically defined, but preferred are α-olefins of the following general formula (IV):

$$R^{14}\text{—CH}=\text{CH}_2 \quad\quad\quad (IV).$$

In formula (IV), $R^{14}$ represents a hydrogen atom or a hydrocarbon group, and the hydrocarbon group may be saturated or unsaturated, and may be linear, branched or cyclic. Concretely, the α-olefins include ethylene, propylene, 1-butene, 1-pentene, 1-hexene, 1-heptene, 1-octene, 1-decene, 3-methyl-1-pentene, 4-methyl-1-pentene, vinylcyclohexane, styrene, p-methylstyrene, etc. One or more of these olefins may be used herein either singly or as combined.

Of the olefins mentioned above, especially preferred is propylene. For its polymerization mode, propylene may be homopolymerized or copolymerized with any other α-olefin such as ethylene, 1-butene or 1-hexene. If desired, dienes such as butadiene, and any other olefins may be additionally used in producing olefin polymers.

In olefin polymerization in the invention, if desired, an olefin may be first prepolymerized and then finally polymerized. For example, an olefin is prepolymerized in the presence of a catalyst prepared by mixing the above-mentioned components (A) solid catalyst component, (B) organoaluminium compound and (C) organosilicon compound in a predetermined ratio, generally at a temperature falling between 1 and 100° C. and under a pressure falling between normal pressure and 50 kg/cm²G or so, and then finally polymerized in the presence of the catalyst and the prepolymerized product. The degree of prepolymerization may fall generally between 0.01 g/g-catalyst and1000 g/g-catalyst, but preferably between 0.01 g/g-catalyst and 100 g/g-catalyst. The mode of final polymerization is not specifically defined, and may be any of solution polymerization, slurry polymerization, vapor-phase polymerization or bulk polymerization. Especially preferred is slurry polymerization. Any of batch polymerization and continuous polymerization may apply to the invention. If desired, two-stage polymerization in which the two stages are effected under different conditions, or block polymerization in which an additional α-olefin such as ethylene, 1-butene or 1-hexene is block-polymerized in the second stage may also apply to the invention. Further, multi-stage polymerization may apply thereto.

Regarding the reaction condition for the method of the invention, the polymerization pressure is not specifically defined and may fall generally between atmospheric pressure and 80 kg/cm²G, but preferably between 2 and 50 kg/cm²G; the polymerization temperature may fall generally between 20 and 90° C., but preferably between 40 and 90° C. The polymerization time shall vary, depending on the type of the starting olefin and on the polymerization temperature, and could not be indiscriminately defined. In general, however, it may fall between 5 minutes and 20 hours, preferably between 10 minutes and 10 hours or so.

The molecular weight of the polymer to be produced can be controlled by adding a chain transfer agent to the polymerization system, preferably hydrogen thereto. If desired, an inert gas such as nitrogen or the like may be present in the polymerization system.

Regarding the catalyst components for use in the invention, the component (A), the component (B) and the component (C) may be previously blended in a predetermined ratio so that they are contacted with each other, and immediately an olefin may be applied thereto to start its polymerization. Alternatively, after the catalyst components have been contacted with each other, the resulting catalyst may be ripened for 0.2 to 3 hours or so, and thereafter an olefin may be applied thereto and polymerized in the presence of the thus-ripened catalyst. If desired, the catalyst components may be previously suspended in an inert solvent or olefin, and then fed into the polymerization system.

In the invention, the post-treatment after polymerization may be effected in any ordinary manner. For example, in vapor-phase polymerization, the powdery polymer produced is taken out of the polymerization reactor, and then exposed to a nitrogen stream atmosphere so as to remove the non-reacted olefin from it. If desired, the polymer may be pelletized through an extruder. In this step, a small amount of water, an alcohol or the like may be added to the polymer so as to completely inactivate the catalyst. In bulk polymerization, the polymer produced is taken out of the polymerization reactor, then the non-reacted monomer is completely removed from it, and thereafter the polymer may be pelletized.

The invention is described concretely with reference to the following Examples, which, however, are not intended to restrict the scope of the invention. The intrinsic viscosity [η], the stereospecificity [mmmm], Mw/Mn, and MI of the samples produced are obtained as follows:

(1) Intrinsic Viscosity [η]:
Measured in tetralin at 135° C.

(2) Stereospecificity [mmmm]:
A sample of the polymer to be analyzed is dissolved in 1,2,4-trichlorobenzene, and subjected to a proton complete decoupling method for $^{13}$C-NMR (using JEOL' EX-400) at 130° C. Based on the signals for the methyl group obtained in the method, the stereospecificity [mmmm] of the sample is determined. The isotactic pentad fraction [mmmm] referred to herein for polymer stereospecificity was proposed by A. Zambelli et al. in *Macromolecules*, 6, 925 (1973), and it indicates the isotactic fraction in the pentad units of a polypropylene molecular chain measured in $^{13}$C nuclear magnetic resonance spectrometry. For the attribution of the peaks seen in the $^{13}$C nuclear magnetic resonance spectrometry, referred to is the A. Zambelli et al's proposal in *Macromolecules*, 3, 687(1975).

(3) Mw/Mn:
This is calculated from the data of gel permeation chromatography (GPC). Briefly, 240 µl of a polymer solution (0.1 weight/volume %) in 1,2,4-trichlorobenzene (containing 300 ppm of BHT) is applied to a mixed polystyrene gel column (Toso's GMH6HT), and passed through it at 145° C. and at a flow rate of 1.0 ml/min. The fractions are detected with an IR detector at a wavelength of 3.41 µm.

(4) MI (melt index):
Measured according to JIS K-7210 under JIS #14 Condition (load: 2.16 kgf, temperature: 230° C.).

[EXAMPLE 1]

Production of Neopentyl-n-pentyldimethoxysilane (1) Production of n-pentyltrimethoxysilane:
3.43 g (150 mmols) of sodium metal was put into a 100-ml three-neck flask in a nitrogen atmosphere, to which was dropwise added 30 ml (947 mmols) of methanol at a rate at which the resulting mixture could be gently refluxed. After the disappearance of sodium from it was confirmed, the system was heated and dried under reduced pressure. Then, 8.69 g (49.0 mmols) of n-propyltrichlorosilane was dropwise added thereto, and ripened under heat. The reaction mixture was analyzed through gas chromatography, which confirmed the disappearance of the starting compound from it. Then, this was distilled to obtain 4.92 g (yield: 62%) of n-pentyltrimethoxysilane.

(2) Production of Neopentyl-n-pentyldimethoxysilane:
473.9 mg (19.5 mmols) of metal magnesium and 19.5 ml of diethyl ether were put into a 100-ml three-neck flask, to which were added a few drops of 1,2-dibromoethane. Then, 2.65 g (17.6 mmols) of neopentyl bromide was dropwise added thereto over a period of 50 minutes. This was ripened under reflux for 8 hours, and the disappearance of neopentyl bromide from it was confirmed. After restored to room temperature, the resulting solution was dropwise added to a solution of 2.60 g (15.8 mmols) of n-propyltrimethoxysilane in diethyl ether, and then refluxed for 14 hours. The disappearance of n-propyltrimethoxysilane from it was confirmed. 5 ml of methanol was added to this, and the resulting solution was filtered, dried, distilled and passed through a separation column to obtain 1.91 g of neopentyl-n-pentyldimethoxysilane. Its purity was 98.9%, and its yield was 59.5%.

[EXAMPLE 2]

(1) Preparation of Solid Catalyst Component:
16 g (0.14 mols) of diethoxymagnesium was put into a nitrogen-purged, 500-ml three-neck flask equipped with a stirrer, to which was added 60 ml of dewatered heptane. This was heated at 40° C., and 2.45 ml (22.5 mmols) of silicon tetrachloride was added thereto. This was stirred for 20 minutes, and 12.7 mmols of dibutyl phthalate was added thereto. The resulting solution was heated up to 80° C., and 77 ml (0.70 mols) of titanium tetrachloride was dropwise added thereto through a dropping funnel. This was kept heated and stirred at 110° C. for 2 hours, whereby the active ingredient was held on the carrier. Then, this was well washed with dewatered heptane, and 122 ml (1.12 mols) of titanium tetrachloride was added thereto, and kept heated and stirred at 110° C. for 2 hours. This is the second-stage carrier-holding operation. Finally, the solid component thus formed herein was well washed with dewatered heptane.

(2) Propylene Slurry Polymerization:
A one-liter stainless autoclave equipped with a stirrer was fully dried and purged with nitrogen, and 400 ml of dewatered heptane was put into it. 0.5 mmols of triethylaluminium and then 0.25 mmols of neopentyl-n-pentyldimethoxysilane were added thereto in that order. Then, 0.005 mmols, in terms of Ti, of the solid catalyst component prepared in (1) was added thereto, and hydrogen (1.0 kg/cm$^2$G) and propylene were introduced thereinto in that order. The autoclave temperature was 80° C.; and the total pressure was 8.0 kg/cm$^2$G. In that condition, the monomer propylene was polymerized at 80° C. for 1 hour. Next, the system was cooled and degassed, and the reaction mixture was taken out of it. This was put into 2 liters of methanol, and then dried in vacuum to obtain polypropylene. The results are given in Table 1.

[COMPARATIVE EXAMPLE 1]

The same process as in Example 2 was repeated, except that dicyclopentyldimethoxysilane and not neopentyl-n-pentyldimethoxysilane was used herein. The results are given in Table 1.

[COMPARATIVE EXAMPLE 2]

The same process as in Example 2 was repeated, except that diisobutyldimethoxysilane and not neopentyl-n-pentyldimethoxysilane was used herein. The results are given in Table 1.

[EXAMPLE 3]

(1) Preparation of Solid Catalyst Component:

13.3 g (0.14 mols) of magnesium chloride (anhydride), 70 ml of decane and 65.5 ml (0.42 mols) of 2-ethylhexyl alcohol were put into a nitrogen-purged, 500-ml three-neck flask equipped with a stirrer, and reacted under heat at 130° C. for 2 hours to prepare a uniform solution. Next, 3.12g (0.021mols) of phthalic anhydride was added to the solution, and stirred and mixed at 130° C. for 1 hour so that it was dissolved in the uniform solution.

The thus-obtained uniform solution was cooled to room temperature, and all of this was dropwise added to 373 ml (3.36 mols) of titanium tetrachloride over a period of 1 hour. After the addition, the resulting uniform solution was heated up to 110° C. over a period of 4 hours, and at the elevated temperature of 110° C., 5.39 ml (0.035 mols) of diisobutyl phthalate was added thereto. With that, this was kept stirred still at 110° C. for 2 hours.

After having been thus reacted for 2 hours, this was filtered while hot to collect the solid precipitate formed therein, and the thus-collected solid precipitate was re-suspended in 275 ml of titanium tetrachloride, and again reacted under heat at 110° C. for 2 hours.

After having been thus reacted, this was again filtered while hot to collect the solid precipitate, which was then washed with decane and hexane at 110° C. Washing it was repeated until no titanium compound was detected in the washes, and a solid component was thus obtained.

(2) Propylene Slurry Polymerization:

Propylene was polymerized in slurry, in the same manner as in Example 2 (2) using the solid catalyst component prepared in above (1). The results are given in Table 1.

[COMPARATIVE EXAMPLE 3]

The same process as in Example 3 was repeated, except that dicyclopentyldimethoxysilane and not neopentyl-n-pentyldimethoxysilane was used herein. The results are given in Table 1.

[EXAMPLE 4]

The same process as in Example 2 was repeated, except that diisopentyldimethoxysilane and not neopentyl-n-pentyldimethoxysilane was used herein. The results are given in Table 1.

[EXAMPLE 5]

The same process as in Example 2 was repeated, except that isopentylisobutyldimethoxysilane and not neopentyl-n-pentyldimethoxysilane was used herein. The results are given in Table 1.

[EXAMPLE 6]

The same process as in Example 2 was repeated, except that neopentylisopentyldimethoxysilane and not neopentyl-n-pentyldimethoxysilane was used herein. The results are given in Table 1.

TABLE 1

| | Organo-silicon Compound | Activity (kg-PP/g-Ti) | [η] (gl/g) | MI (g/10 min) | [mmmm] (%) | Mw/Mn |
|---|---|---|---|---|---|---|
| Example 2 | neopentyl-n-propyl-dimethoxy-silane | 530 | 1.10 | 50.2 | 97.8 | 4.70 |
| Comparative Example 1 | dicyclopentyl-dimethoxy-silane | 670 | 1.43 | 17.4 | 97.7 | 5.41 |
| Comparative Example 2 | diisobutyl-dimethoxy-silane | 510 | 1.09 | 49.1 | 94.5 | 4.65 |
| Example 3 | neopentyl-n-propyl-dimethoxy-silane | 470 | 1.10 | 50.3 | 97.7 | 4.60 |
| Comparative Example 3 | dicyclopentyl-dimethoxy-silane | 520 | 1.40 | 19.7 | 97.6 | 5.22 |
| Example 4 | diisopentyl-dimethoxy-silane | 650 | 1.13 | 48.8 | 98.1 | 4.82 |
| Example 5 | isopentyl-isobutyldi-methoxysilane | 630 | 1.02 | 58.2 | 98.0 | 4.77 |
| Example 6 | neopentyl-isopentyldi-methoxysilane | 630 | 1.15 | 44.5 | 98.0 | 4.83 |

INDUSTRIAL APPLICABILITY

The invention provides a catalyst for olefin polymer production, which contains an organosilicon compound having a specific structure. Olefin polymers produced by the use of the catalyst have increased stereospecificity and increased melt fluidity. The invention also provides a method for producing such olefin polymers.

What is claimed is:

1. An external electron donor for producing olefin polymer of the general formula (I):

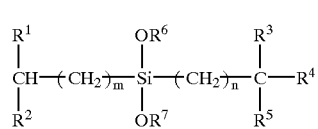

wherein $R^1$ to $R^3$ each represent a hydrogen atom or a hydrcarbon group, and they may be the same or different, and may be bonded to the adjacent group to form a ring; $R^4$ and $R^5$ each represent a hydrocarbon group, and they may be the same or different, and may be bonded to the adjacent group to form a ring; $R^6$ and $R^7$ each represent a hydrocarbon group having from 1 to 10 carbon atoms, and they may be the same or different; m is an integer of at least 2; and n is an integer of at least 1.

2. An external electron donor for producing olefin polymers of the general formula (I):

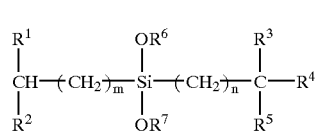

wherein $R^1$ to $R^3$ each represent a hydrogen atom or a methyl group or an ethyl group, and they may be the same or different; $R^4$ and $R^5$ each represent a methyl group or an ethyl group, and they may be the same or different; $R^6$ and $R^7$ each represent a methyl group or an ethyl group, and they may be the same or different; m is 2; and n is 1.

3. An external electron donor for producing olefin polymers as claimed in claim 2 selected from the group consisting of neopentyl-n-pentyldimethoxysilane, neopentyl-n-propyl-dimethoxysilane, diisopentyl-dimethoxysilane, isopentylisobutyl-dimethoxysilane and neopentylisopentyl-dimethoxysilane.

4. An external electron donor for producing olefin polymers as claimed in claim 2 selected from the group consisting of diisopentyl-dimethoxysilane, isopentylisobutyl-dimethoxysilane and neopentylisopentyl-dimethoxysilane.

5. An external electron donor for producing olefin polymers, which consists of one or more organosilicon compound of the general formula (I):

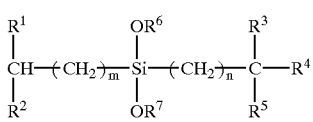

(I)

wherein $R^1$ to $R^3$ each represent a hydrogen atom, a methyl group or an ethyl group, and they may be the same or different, $R^4$ and $R^5$ each represent a methyl group or an ethyl group, and they may be the same or different; $R^6$ and $R^7$ each represent a methyl group or an ethyl group, and they may be the same or different; m is 2; and n is 1.

6. A catalyst for olefin polymer production, which comprises (A) a solid catalyst component comprising titanium, magnesium and an electron donor compound, (B) an organoaluminum compound, and (C) the organosilicon compound of the general formula (I):

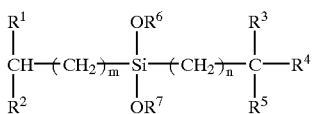

(I)

wherein $R^1$ to $R^3$ each represent a hydrogen atom or a hydrocarbon group, and they may be the same or different, and may be bonded to the adjacent group to form a ring; $R^4$ and $R^5$ each represent a hydrocarbon group, and they may be the same or different, and may be bonded to the adjacent group to form a ring; $R^6$ and $R^7$ each represent a linear hydrocarbon group having from 1 to 10 carbon atoms, and they may be the same or different; m is an integer of at least 2; and n is an integer of at least 1.

7. A catalyst for olefin polymer production, which comprises (A) a solid catalyst component comprising titanium, magnesium and an electron donor compound, (B) an organoaluminum compound, and (C) the organosilicon compound of the general formula (I):

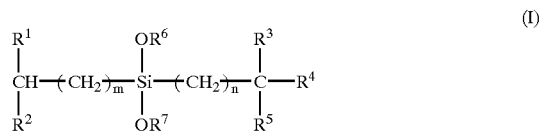

(I)

wherein $R^1$ to $R^3$ each represent a hydrogen atom, a methyl group or an ethyl group, and they may be the same or different, $R^4$ and $R^5$ each represent a methyl group or an ethyl group, and they may be the same or different; $R^6$ and $R^7$ each represent a methyl group or an ethyl group, and they may be the same or different; m is 2; and n is 1.

8. A catalyst for olefin polymer production as claimed in claim 7, wherein said organosilicon compound is selected from the group consisting of neopentyl-n-pentyldimethoxysilane, neopentyl-n-propyldimethoxysilane, diisopentyl-dimethoxysilane, isopentyl-isobutyl-dimethoxysilane and neopentylisopentyl-dimethoxysilane.

9. A catalyst for olefin polymer production as claimed in claim 8, wherein said organosilicon compound is selected from the group consisting of diisopentyl-dimethoxysilane, isopentylisobutyl-dimethoxysilane and neopentylisopentyl-dimethoxysilane.

10. A catalyst for olefin polymer production, which comprises (A) a solid catalyst component comprising titanium, magnesium and an electron donor compound, (B) an organoaluminium compound, and (C) the external electron donor of claim 5.

11. A method for producing olefin polymers, which comprises polymerizing an olefin by the use of the catalyst of claim 6.

12. The method for producing olefin polymers as claimed in claim 11, wherein the olefin is propylene.

13. A method for producing olefin polymers, which comprises polymerizing an olefin by the use of the catalyst of claim 10.

14. The method for producing olefin polymers as claimed in claim 13, wherein the olefin is propylene.

* * * * *